(12) United States Patent
Keech et al.

(10) Patent No.: US 7,265,302 B2
(45) Date of Patent: Sep. 4, 2007

(54) ARTICLE OF LUGGAGE WITH INTERNALLY BUILT-IN WEIGHT MEASUREMENT AND DISPLAY AND METHOD THEREFOR

(76) Inventors: Judy Keech, 865 Mineral Spring Ave., Pawtucket, RI (US) 02860; Cindy Robitaille, 865 Mineral Spring Ave., Pawtucket, RI (US) 02860

(*) Notice: Subject to any disclaimer, the term of this patent is extended or adjusted under 35 U.S.C. 154(b) by 0 days.

(21) Appl. No.: 11/359,247

(22) Filed: Feb. 22, 2006

(65) Prior Publication Data
US 2006/0196708 A1  Sep. 7, 2006

Related U.S. Application Data

(60) Provisional application No. 60/659,596, filed on Mar. 7, 2005.

(51) Int. Cl.
*G01G 19/52* (2006.01)
*G01G 19/58* (2006.01)
(52) U.S. Cl. ............... 177/131; 177/245; 190/100; 206/278
(58) Field of Classification Search ............ 177/126, 177/131, 148, 245; 190/100; 206/278
See application file for complete search history.

(56) References Cited

U.S. PATENT DOCUMENTS

| | | | | |
|---|---|---|---|---|
| 2,518,973 A | * | 8/1950 | Atherton | 190/102 |
| 2,710,083 A | * | 6/1955 | White | 190/102 |
| 2,937,016 A | * | 5/1960 | Westman | 177/156 |
| 3,090,454 A | * | 5/1963 | Farrar et al. | 177/131 |
| 7,084,357 B2 | * | 8/2006 | Roberts et al. | 177/131 |
| 7,151,231 B2 | * | 12/2006 | Kamakau | 177/126 |
| 7,156,918 B2 | * | 1/2007 | Marks | 177/168 |
| 7,161,097 B1 | * | 1/2007 | Gorgone | 177/126 |
| 2005/0051586 A1 | * | 3/2005 | Siwak et al. | |
| 2007/0107947 A1 | * | 5/2007 | Truong | |

* cited by examiner

*Primary Examiner*—Randy W Gibson
(74) *Attorney, Agent, or Firm*—James Ray & Assoc.

(57) ABSTRACT

An article of luggage has a casing and at least a carrying handle attached to the casing. A member engageable with a predetermined portion of the casing for measuring a weight of contents loaded therein and for generating display signals. A display is connected to the casing and is coupled to the weight measuring means for displaying the weight of such contents loaded into the casing in response to such display signals, wherein the display signals are representative of the weight of such contents. A power source is coupled to the weight measuring member and the display.

14 Claims, 2 Drawing Sheets

US 7,265,302 B2

ARTICLE OF LUGGAGE WITH INTERNALLY BUILT-IN WEIGHT MEASUREMENT AND DISPLAY AND METHOD THEREFOR

CROSS-REFERENCE TO RELATED APPLICATIONS

This application is related to and claims priority from Provisional Patent Application Ser. No. 60/659,596 filed Mar. 7, 2005.

FIELD OF THE INVENTION

The present invention relates, in general, to luggage and, more particularly, this invention relates to an apparatus for and a method of determining a weight of contents loaded into such article of luggage.

BACKGROUND OF THE INVENTION

As is generally well known, articles of luggage are used for carrying contents in a variety of applications. In some applications, for example such as flying on a commercial aircraft, a weight limitation is mandated for each article of luggage placed into the storage portion of such aircraft and penalties are imposed when the total weight of the article of luggage and contents loaded into it exceed such mandated limitation. Unfortunately, many passengers are limited in an ability to determine the total weight of such article of luggage prior to arriving at the airport and checking their luggage in. Those who do not wish to pay penalties must remove a portion of the contents from one article of luggage and load them into a different article of luggage in order to meet the mandated weight limitations. Such need to reload the contents usually results in inconveniences to the passengers and delays during checking in.

SUMMARY OF THE INVENTION

The present invention provides an article of luggage which is capable of determining a weight of contents loaded into it. The article of luggage includes a casing having each of a predetermined shape and predetermined size. At least one carrying handle is attached to the casing. A member is engageable with a predetermined portion of the casing for measuring a weight of the contents loaded therein and for generating signals. A display is connected to the casing and is coupled to the weight measuring means for displaying the weight of such contents placed into the casing in response to such display signals, wherein the display signals are representative of the weight of such contents. A power source is coupled to the weight measuring member and the display.

OBJECTS OF THE INVENTION

It is, therefore, one of the primary objects of the present invention to provide an apparatus and method for determining weight of contents loaded into an article of luggage.

Another object of the present invention is to provide an apparatus and method for determining weight of contents loaded into an article of luggage in combination with a weight thereof.

Yet another object of the present invention is to provide an apparatus for determining weight of contents loaded into an article of luggage which is simple to use and install.

A further object of the present invention is to provide an apparatus and method for determining weight of contents loaded into an article of luggage of various types and construction.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
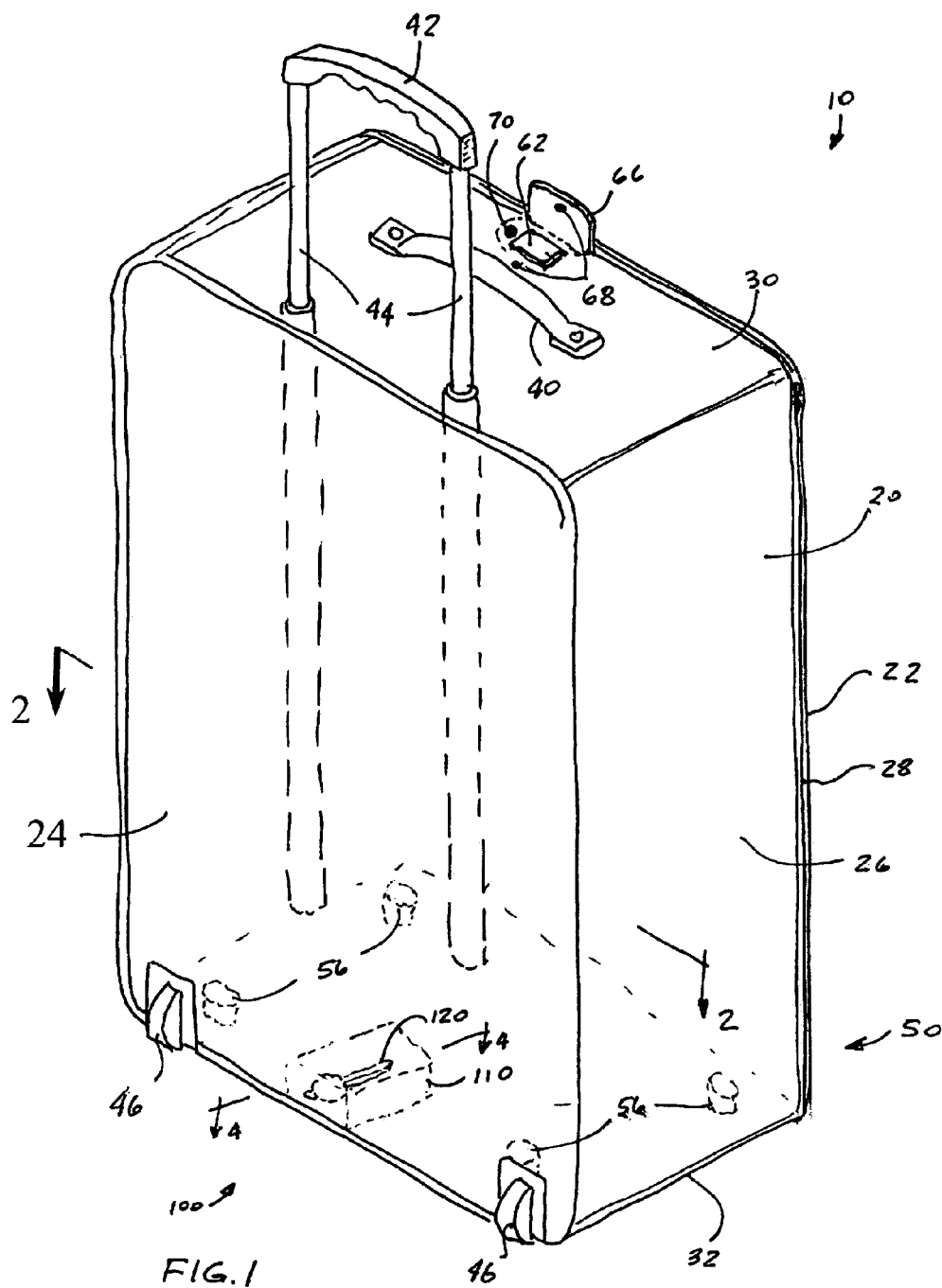
FIG. 1 is a rear perspective view of the present invention in combination with an upright article of luggage capable of being towed.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a piece of luggage applies to a hand bag, case, suitcase, carry-on case, travel case, garment carrier, duffle bag, backpack and like devices for holding clothing, personal belongings or other articles therein.

Figure 2:
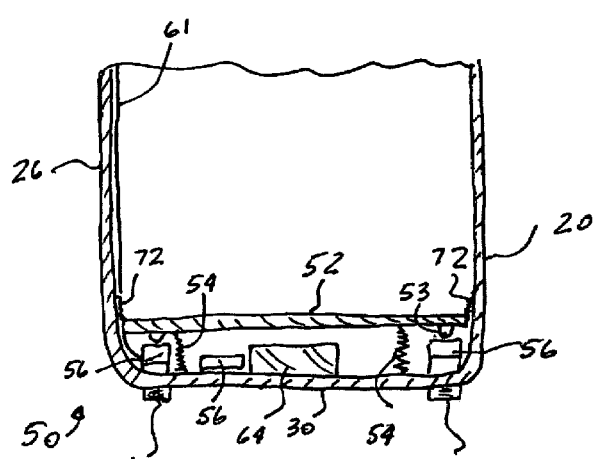
FIG. 2 is a partial cross-sectional view of the present invention taken along the lines 2-2 of FIG. 1.
Figure 3:
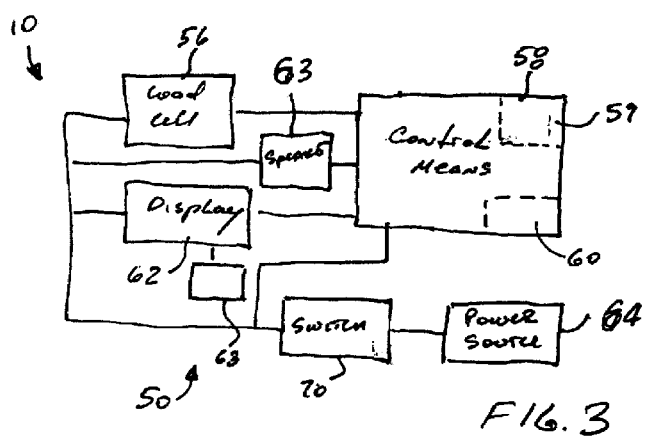
FIG. 3 is a schematic diagram of the present invention.

Reference is now made, to FIGS. 1-3, wherein there is shown an article of luggage generally designated 10. By way of example, such article of luggage 10 is illustrated as an upright suitcase which includes a casing 20 having each of a predetermined shape and predetermined size. The casing 20 has a front wall 22, a back wall 24 and a peripheral side wall 26 joining such front wall 22 and back wall 24. As it is well known in the art, the front wall 22 is generally at least partially connected to the peripheral side wall 26 with a zipper means 28.

The article of luggage 10 is provided with at least one handle 40 generally attached to a top portion 30 of the peripheral side wall 26 for carrying such article of luggage 10.

Furthermore, provided therewith is a handle bar 42 and its supporting telescoping legs 44 which are generally attached to the casing 20 adjacent such back wall 24 and are retractable and extendable for towing the article of luggage 10 which is than additionally provided with at least a pair of ground engaging wheels 46 attached to a bottom portion 32 of the peripheral side wall 26 or attached to the back wall 24 in close proximity to the bottom portion 32 as shown in FIG. 1.

The article of luggage 10 of the present invention further includes means, generally designated 50, best shown in FIGS. 2-3, which is engageable with a first predetermined portion of the casing 20 for measuring a weight of the contents placed into the casing 20 and for generating a display signal. In the presently preferred embodiment, such weight measuring means 50 includes a load receiving member 52 which is disposed in a spaced relationship from a first predetermined portion of casing 20, preferably the bottom portion 30 of the peripheral side wall 26 and is movably mounted thereto.

Preferably, such load receiving member 52 is mounted internal to said casing 20, as illustrated in FIG. 2. At least one load cell 56 of a strain gauge type is disposed intermediate such bottom portion 32 and the load receiving member 52 for providing digital weight signals upon contact with a predetermined portion 53 of movable load receiving member 52.

The structure and operation of a strain gauge load cell 56 is well known in the art and does not form part of the present invention. For the sake of reader's convenience in understanding the present invention, such strain gauge load cell 56 is essentially a measuring element that converts force into an electrical signal. The strain gauges themselves are bonded onto a structural member that deforms when a load is applied. Generally for strain gauges are used in what is well known in the art as a Wheatstone bridge circuit. When a load is applied, the electrical resistance of one of the gauges changes in proportion to the applied load. It is possible for other types of load cells 56 such as piezoresistive, inductive, reluctance, and magnetostrictive to also be used in the present invention.

At least one spring 54 is engageable with the load receiving member 52 for maintaining it in the spaced relationship with the bottom portion 32 and, particularly, in a predetermined spaced relationship from such at least one load cell 56.

Furthermore, although the at least one spring 54 is shown as disposed independent to the load cell 56, such spring 54 may be integrated into a load cell assembly as disclosed in U.S. Pat. No. 6,797,894 to Montagnino et al and which is incorporated into this document by reference thereto.

A control means 58, preferably a microprocessor and having a signal processing means 60 is provided for receiving the digital weight signals for amplifying them if required and for generating the display signals indicative of the weight of such contents.

It will be appreciated that the quantity of the load cells 56 will depend on the size of such bottom portion 32 and further on an accuracy of the content weight to be measured. Accordingly, the operation of the control means 56 will be adjusted proportional to the quantity of the load cells 56.

Means 62 is connected to a second predetermined portion of the casing 20 and is coupled to the weight measuring means 50 for annunciating the weight of such contents loaded into the casing 20 in response to the generated display signals. Such display signals are being representative of the weight of such contents placed into the casing 20.

Such annunciation means 62 may be one of display, audible alarm, voice and various combinations thereof. Preferably, such annunciation means 62 is a display 62 attached to the top portion 32 of the casing 20 in close proximity to the handle 40 of such article of luggage 10. A conduit 61, attached to the interior surface of the side wall 26 is provided for housing the wires (not shown) connecting the display 62 with the control means 58 and the power source 64. Alternatively, the display 62 may include a receiver 63 and control means 58 may be provided with a transmitter 59 for wireless communication of such generated display signals.

The display 62 may be any suitable indicator including but not limited to a liquid crystal display or a light emitting diode.

When such annunciation means 62 is an alarm or a voice, the article of luggage is provided with a speaker 63 coupled to the control means 58.

A power source 64 is coupled to the control means 54, weight measuring means 50 and the weight annunciating means 62. The power source 64 is a DC power source, such as a battery 64. The battery 64 may be of a rechargeable or a non-rechargeable type.

In operation, when the contents are loaded into the casing 20, the article of luggage 10 is placed in a position wherein such contents form a load acting on the load receiving member 52 which then moves against the force of the at least one spring 54 to apply the load to at least one load cell 56 causing it to generate such digital weight signals which are then processed by the control means 58 to generate the display signal enabling the display means 62 to display the weight of contents loaded into such casing 20.

It will be understood, that the control means 58 may be configured to compensate for a predetermined weight of the casing 20, handle 40, towing means 42 and 44, and ground engaging wheels 46 so that the total weight of such article of luggage 10 having such contents placed therein is displayed at the display 62 which is advantageous in a number of applications, for example, when such article of luggage 10 is to be loaded onto an aircraft (not shown).

To prevent the display 62 from damage during use of the article of luggage 10, particularly, during handling of such article of luggage 10 by others, a display cover 66 is attached to the exterior portion of the casing 20, preferably in a hinged fashion and the article of luggage 10 is also provided with a fastening means 68 for fastening such display cover 64 to the casing 20. For example, a snap type fastener is illustrated in FIG. 1, although it will be understood by those skilled in the art that other types of fasteners can be used.

A switch means 70, preferably disposed adjacent the display 62, is provided for selectively activating and deactivating operation of the weight measuring means 50 and the display 62. It will be appreciated that such switch means 70 is advantageous in extending the life of the power source 64.

Furthermore, the load receiving member 52 may be provided with a flexible member 72 peripherally and releasably connecting such load receiving member 52 to the interior surface of the casing 20 for at least closing such weight measuring means 50.

Although the present invention has been shown in terms of the load receiving member 52 being disposed internal to the casing 20, it will be apparent to those skilled in the art, that the such load receiving member 52 and the flexible member 72 may be disposed external to the bottom portion 32 of the side wall 26.

Furthermore, it will be understood that at least one load cell 56 may be attached to such load receiving member 52 for engagement with a predetermined portion of the side wall 26.

Additionally, weight measuring means of a mechanical type and a corresponding mechanical linkage for display operation may be utilized in place of a digital weight measuring means described above.

Figure 4:
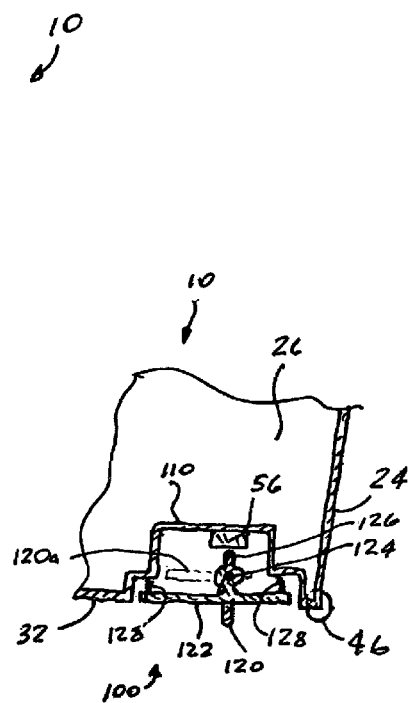
FIG. 4 is a partial cross-sectional view of an alternative embodiment of the present invention taken along the lines 4-4 of FIG. 1.

A weight measuring means, generally designated 100, of an alternative embodiment is best shown in FIG. 4. Such weight measuring means 100 includes a load receiving member 120 mounted external to the bottom portion 32 of the side wall 26. Preferably, such bottom portion 32 is provided with a pocket 110 having a predetermined shape and having a load cell 56 attached thereto. Preferably, the load receiving member 120 is pivotally mounted to a plate like member 122 at a pivot 124 and has a load transmitting portion 126. The plate like member 122 is connected to the pocket 110 with a plurality of springs 128 for maintaining such load transmitting portion 126 in a predetermined spaced relationship with the load cell 56. Advantageously, the load receiving member 120 is pivotally movable between a first operative position for sensing the weight of such article of luggage 10 and a second non-operative position shown by reference numeral 120a.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A method for determining at least a weight of contents loaded into an article of luggage, said method comprising the steps of:
   (a) providing a weight measuring means operably engageable with a first predetermined portion of said article of luggage for measuring such at least weight of said contents loaded thereinto, said weight measuring means including at least one load cell which is stationary secured to said first predetermined portion internal to said article of luggage, a load receiving member positioned internal to said article of luggage, means engageable with said load receiving member and said first predetermined portion for maintaining said load receiving member in a spaced relationship from said at least one load cell when said article of luggage is empty and for enabling said load receiving member to move toward and contact said at least one load cell when contents are placed onto said load receiving member thus generating digital weight signals being representative of said at least weight of said contents and a control means having a signal processing means for receiving said digital weight signals and for generating corresponding weight annunciating signals therefrom;
   (b) providing means disposed in a second predetermined portion of such article of luggage for annunciating at least such weight of such contents loaded therein and measured by said weight measuring means;
   (c) placing such contents into such article of luggage;
   (d) using said weight measuring means to measure at least such weight of such contents loaded into such article of luggage in step (c); and
   (e) using said weight annunciating means to annunciate such weight of such contents measured in step (d).

2. The method, according to claim 1, wherein said weight annunciating means is one of a display, audible alarm, voice and various combinations thereof.

3. The method, according to claim 1, wherein said weight annunciating means is a display disposed in close proximity to a carrying member of such article of luggage.

4. The method, according to claim 3, wherein said display is coupled to said weight measuring means in one of a wired and wireless configuration.

5. The method, according to claim 3, wherein said method includes a step of providing a cover engageable with said casing for selectively covering and uncovering said display.

6. An article of luggage comprising:
   (a) a casing having each of a predetermined shape and predetermined size;
   (b) means connected to exterior surface of said casing for at least one of carrying and towing said casing;
   (c) means operably engageable with a first predetermined portion of said casing for measuring at least a weight of contents loaded threinto and for generating display signals, said weight measuring means including:
      (i) at least one load cell which is stationary secured to said first predetermined portion internal to said casing,
      (ii) a load receiving member positioned internal to said casing,
      (iii) means engageable with said load receiving member and said first predetermined portion for maintaining said load receiving member in a spaced relationship from said at least one load cell when said article of luggage is empty and for enabling said load receiving member to move toward and contact said at least one load cell when contents are placed onto said load receiving member thus generating digital weight signals, and
      (iv) a control means having a signal processing means for receiving said digital weight signals and for generating said weight annunciating signals therefrom, said weight annunciating signals being representative of such at least weight of such contents;
   (d) means connected to a second predetermined portion of said casing and coupled to said weight measuring means for annunciating such at least weight of such contents placed into said casing in response to said generated weight annunciating signals; and
   (e) power source coupled to said weight measuring means and said weight annunciating means.

7. The article of luggage, according to claim 6, wherein said at least one load cell is a strain gage load cell.

8. The article of luggage, according to claim 6, wherein said means engageable with said load receiving member for maintaining it in said spaced relationship is at least one spring.

9. The article of luggage, according to claim 8, wherein said at least one spring is disposed external to said at least one load cell.

10. The article of luggage, according to claim 6, wherein said first predetermined portion is generally oriented towards and disposed adjacent a surface having such article of luggage being placed on.

11. The method, according to claim 1, wherein said method further includes the step of using said control means to compensate for a predetermined empty weight of said article of luggage having said weight measuring means and said weight annunciating means incorporated therein, whereby the weight annunciated by said weight annunciation means is a total weight of said article of luggage having said contents loaded thereinto.

12. The article of luggage, according to claim 6, wherein said article of luggage further includes a switch means for selectively activating and deactivating operation of said weight measuring means and said weight annunciating means.

13. An article of luggage comprising:
   (a) a casing having each of a predetermined shape and predetermined size;
   (b) means connected to exterior surface of said casing for at least one of carrying and towing said casing;

(c) a pocket which is formed in a bottom wall of said casing and which is exposed to ambient surrounding;

(d) means which is positioned within said pocket for measuring weight of said article of luggage and for generating weight annunciating signals being representative of said measured weight, said weight measuring means including:

(i) a load cell secured to a wall of said pocket which is positioned in a horizontal plane when said article of luggage is in upright position, (ii) a member positioned generally coplanar with said bottom wall for closing said pocket, (iii) a load receiving member which is pivotally movable between a first operative position for sensing weight of said article of luggage and a second non-operative position, (iv) a pivot means formed on said member for enabling pivotal movement of said load receiving member, (v) a spring means connected to said member and to said pocket for enabling linear movement of said load receiving member being in said first operative position for engaging said load cell and for applying force thereto causing said load cell to generate digital weight signal which is representative of said weight of said article of luggage, and (vi) a control means having a signal processing means for receiving said digital weight signal and for generating said weight annunciating signals therefrom;

(e) means connected to a predetermined portion of said casing and coupled to said weight measuring means for annunciating said measured weight in response to said generated weight annunciating signals; and (f) a power source coupled to said weight measuring means and said weight annunciating means.

14. The article of luggage, according to claim 13, wherein a portion of said load receiving member being disposed in said first operative position engages a surface having said article of luggage being placed.

* * * * *